United States Patent
Auchmoody et al.

(10) Patent No.: US 9,747,164 B1
(45) Date of Patent: Aug. 29, 2017

(54) GUIDE WORD PAGED HASH TABLE

(71) Applicant: EMC IP Holding Company LLC, Hopkinton, MA (US)

(72) Inventors: Scott Auchmoody, Irvine, CA (US); Mark Malamut, Dana Point, CA (US)

(73) Assignee: EMC IP Holding Company LLC, Hopkinton, MA (US)

(*) Notice: Subject to any disclaimer, the term of this patent is extended or adjusted under 35 U.S.C. 154(b) by 282 days.

(21) Appl. No.: 14/588,447

(22) Filed: Jan. 1, 2015

(51) Int. Cl.
*G06F 17/00* (2006.01)
*G06F 11/14* (2006.01)
*H04L 29/08* (2006.01)

(52) U.S. Cl.
CPC ...... *G06F 11/1412* (2013.01); *H04L 67/2842* (2013.01)

(58) Field of Classification Search
CPC .... G06F 17/30; G06F 17/00; G06F 17/30067; G06F 11/14; G06F 11/64; G06F 11/1412
USPC ................................................ 707/600–899
See application file for complete search history.

(56) References Cited

U.S. PATENT DOCUMENTS

2010/0005316 A1* 1/2010 LeGendre ............ G06F 21/121
713/189

* cited by examiner

*Primary Examiner* — Isaac M Woo
(74) *Attorney, Agent, or Firm* — Staniford Tomita LLP (57) ABSTRACT

A set of pages including a set of entries are stored on disk. A set of page headers are stored in memory. Each page header corresponds to a page on disk. A page header includes a page number identifying a corresponding page on disk, a first guide word, and a second guide word. The first and second guide words define minimum and maximum name values, respectively, of entries on the page. Upon a request to determine if an entry associated with a name value exists, the page headers are scanned to identify a page number in a header where the name value is between the guide words. The page, if not resident in memory, is located on disk, loaded into memory, and examined to determine whether the entry exists on the page.

18 Claims, 7 Drawing Sheets

GUIDE WORD PAGED HASH TABLE

TECHNICAL FIELD

The present invention relates generally to the field of information technology, and, more particularly, to systems and techniques for managing memory and accessing data.

BACKGROUND

Computer systems typically include memory and disk. Generally, accessing data stored in memory is much faster than accessing data stored on disk. Memory, however, is much more expensive than disk. So, for a given computer system, memory will typically be much smaller than disk. Thus, data storage and access algorithms have been developed to manage the interaction between memory and disk.

A b-tree is one type of algorithm that is commonly used to store and retrieve records between memory and disk. A b-tree index includes a root node at the top of the tree, leaf nodes at the bottom of the tree, and intermediate nodes between the root and leaf nodes. Records are stored in the leaves of the tree. The records can be found by passing down through the various nodes of the tree.

In a typical b-tree application, there can be thousands, millions, or even billions of records. The depth of a b-tree can be proportional to the number of records. In a b-tree implementation, the upper portion of the tree may be kept in memory and traversing through each layer of the tree can result in a disk access. B-trees suffer from being disk bound when their top level exceeds available memory. As discussed above, accessing disk is time consuming because a disk has mechanical parts that are used to locate and access data. The overhead can be particularly acute during, for example, backup operations when the whole filesystem may be traversed.

Thus, there is a need for a more efficient data structure and method of data access that has small memory requirements and few disk access requirements.

BRIEF DESCRIPTION OF THE FIGURES

In the following drawings like reference numerals designate like structural elements. Although the figures depict various examples, the one or more embodiments and implementations described herein are not limited to the examples depicted in the figures.

DETAILED DESCRIPTION

Figure 1:
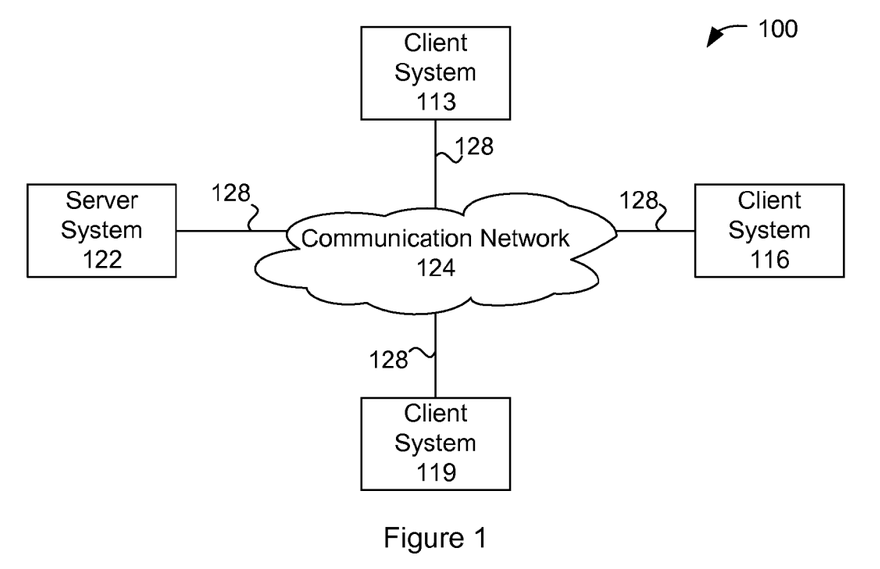
FIG. 1 shows a block diagram of a client-server system and network in which an embodiment of the system may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, an intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the system have been described using a client-server environment, it should be apparent that the system may also be embodied in a stand-alone computer system. Aspects of the system may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, Google Chrome provided by Google, Safari provided by Apple Inc., and the Firefox browser provided by Mozilla Foundation, and others.

Figure 2:
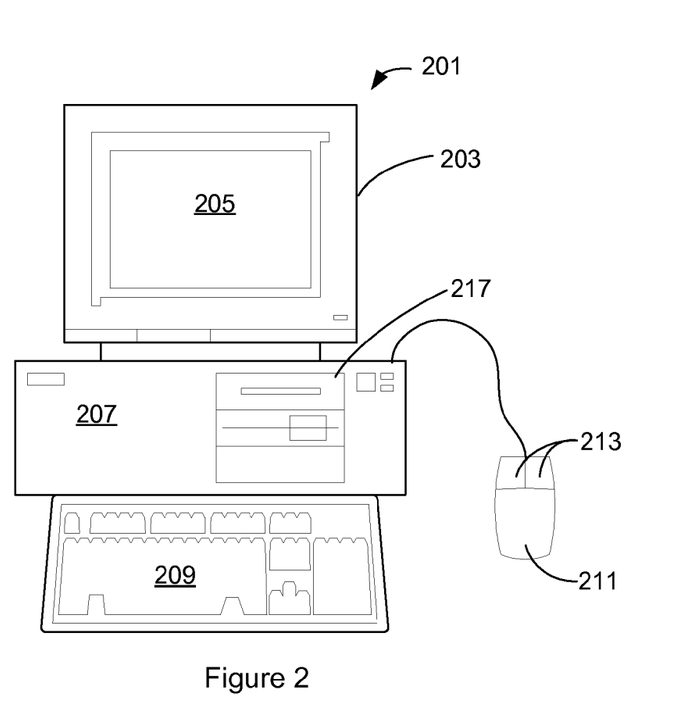
FIG. 2 shows a more detailed diagram of an example of a client or computer which may be used in an embodiment of the system.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other nonvolatile solid-state storage (e.g., USB flash drive), battery-backed-up volatile memory, tape storage, reader, and other similar media, and combinations of these.

A computer-implemented or computer-executable version of the system may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, and volatile media. Nonvolatile media includes, for example, flash memory, or optical or magnetic disks. Volatile media includes static or dynamic memory, such as cache memory or RAM.

For example, a binary, machine-executable version, of the software of the present system may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, or through a network such as the Internet.

Figure 3:
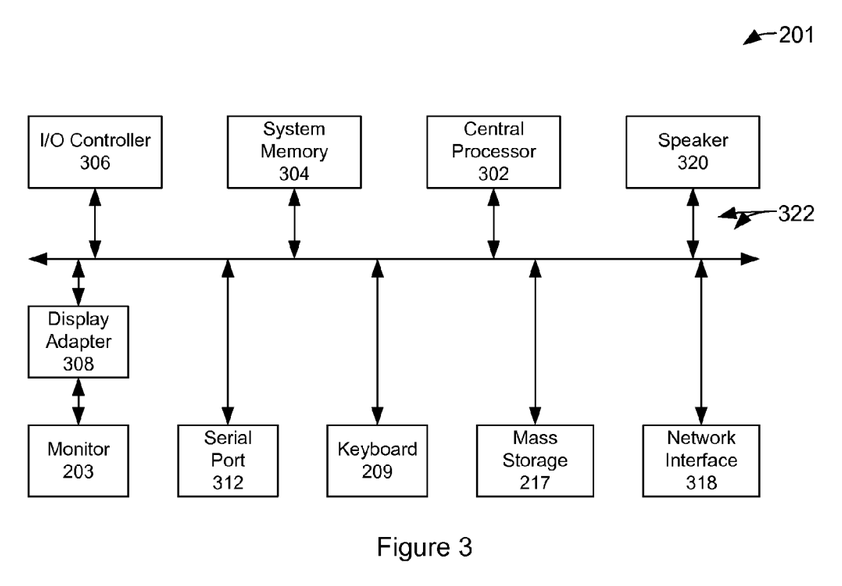
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present system provides a computer program product which stores instructions such as computer code to program a computer to perform any of the processes or techniques described.

An operating system for the system may be one of the Microsoft Windows® family of operating systems (e.g., Windows NT, Windows 2000, Windows XP, Windows XP x64 Edition, Windows Vista, Windows 7, Windows CE, Windows Mobile, Windows 8), Linux, HP-UX, TRU64, UNIX, Sun OS, Solaris SPARC and x64, Mac OS X, Alpha OS, AIX, IRIX32, or IRIX64. Other operating systems may also or instead be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
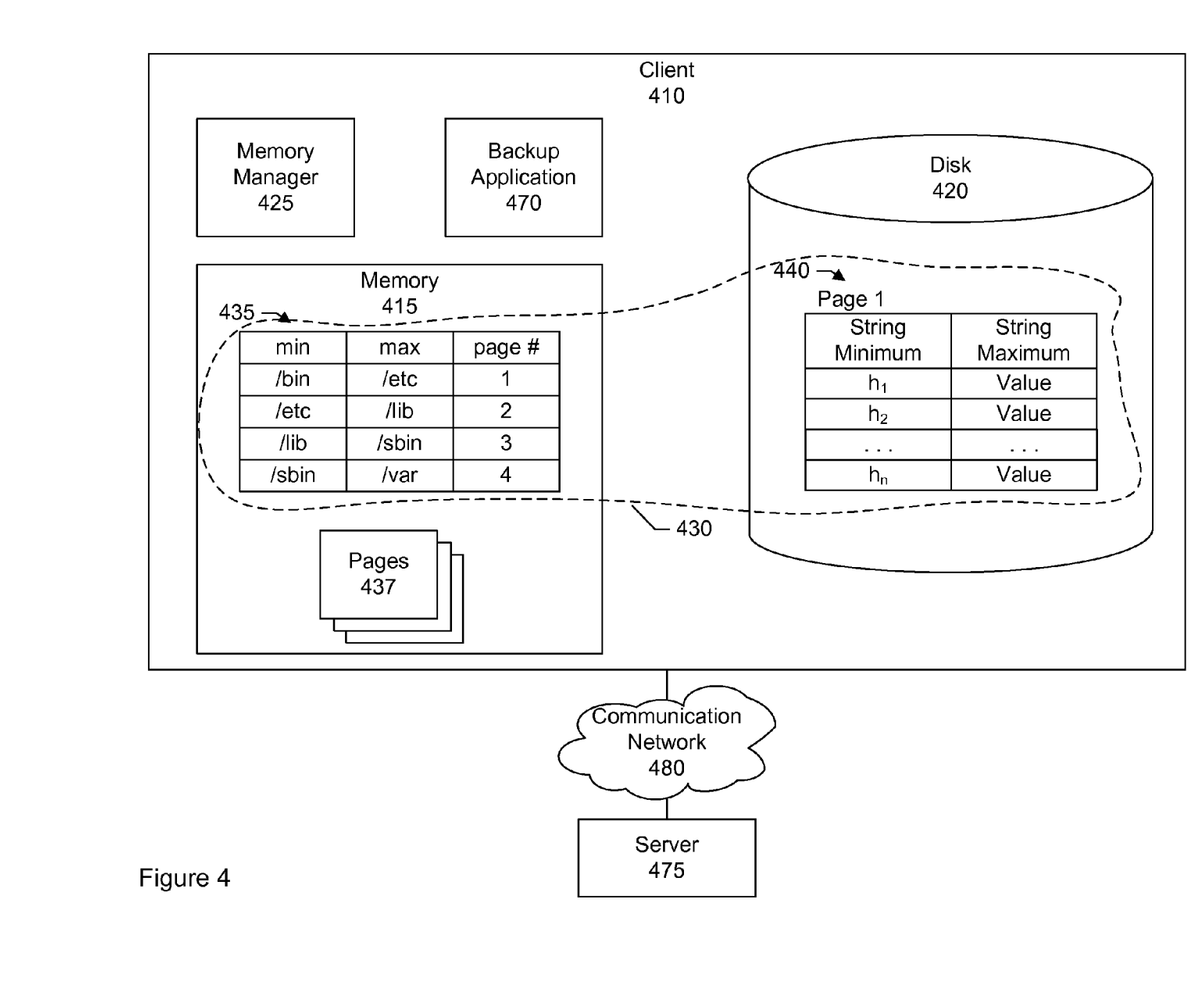
FIG. 4 shows an overall architecture of a system for a guide word paged hash table in a specific embodiment.

FIG. 4 shows a computing environment of a system including a guide word paged hash table. As shown in the example of FIG. 4, a client 410 includes memory 415, disk 420, and a memory manager 425. The client, memory, and disk may be as described in the discussion above accompanying FIGS. 1-3.

The memory manager is responsible for managing the interaction between memory and disk. For example, the memory manager may include code or logic for allocating memory, freeing memory, address translations (e.g., virtual address to physical address translations), loading a page from disk to memory, writing a page from memory to disk, tracking page attributes (e.g., whether page has been written to, whether page has been accessed, operations allowed on a page, and the like), accessing a page, inserting data into a page, or combinations of these.

Paging is a memory management technique in which storage (e.g., memory, disk, or both) is organized or divided into fixed size pages. That is, a page may include a fixed amount of data (e.g., 4096 bytes). Memory blocks or pages are transferred between memory and disk as required for an application program. Each page is associated with a page number or other designation which uniquely identifies the page in storage. Pages may be positioned or arranged sequentially (e.g., page 1, page 2, page, 3, and so forth). A read from disk may specify the page to read from and the number of pages to read.

In a specific embodiment, a data structure 430 is provided for holding namespace data typically from a filesystem in a memory-constrained environment where it may be necessary to represent billions of objects in a single namespace. An object or item may include a folder, directory, file, portion of a file, multiple files (e.g., two or more files or filesets), multiple folders, multiple directories, chunk, path name, filename, or any other unit of data. The data structure may be referred to as a guide word paged table. In this specific embodiment, the data structure includes two portions. There is an in memory portion 435 and an on disk portion 440.

Figure 5A:
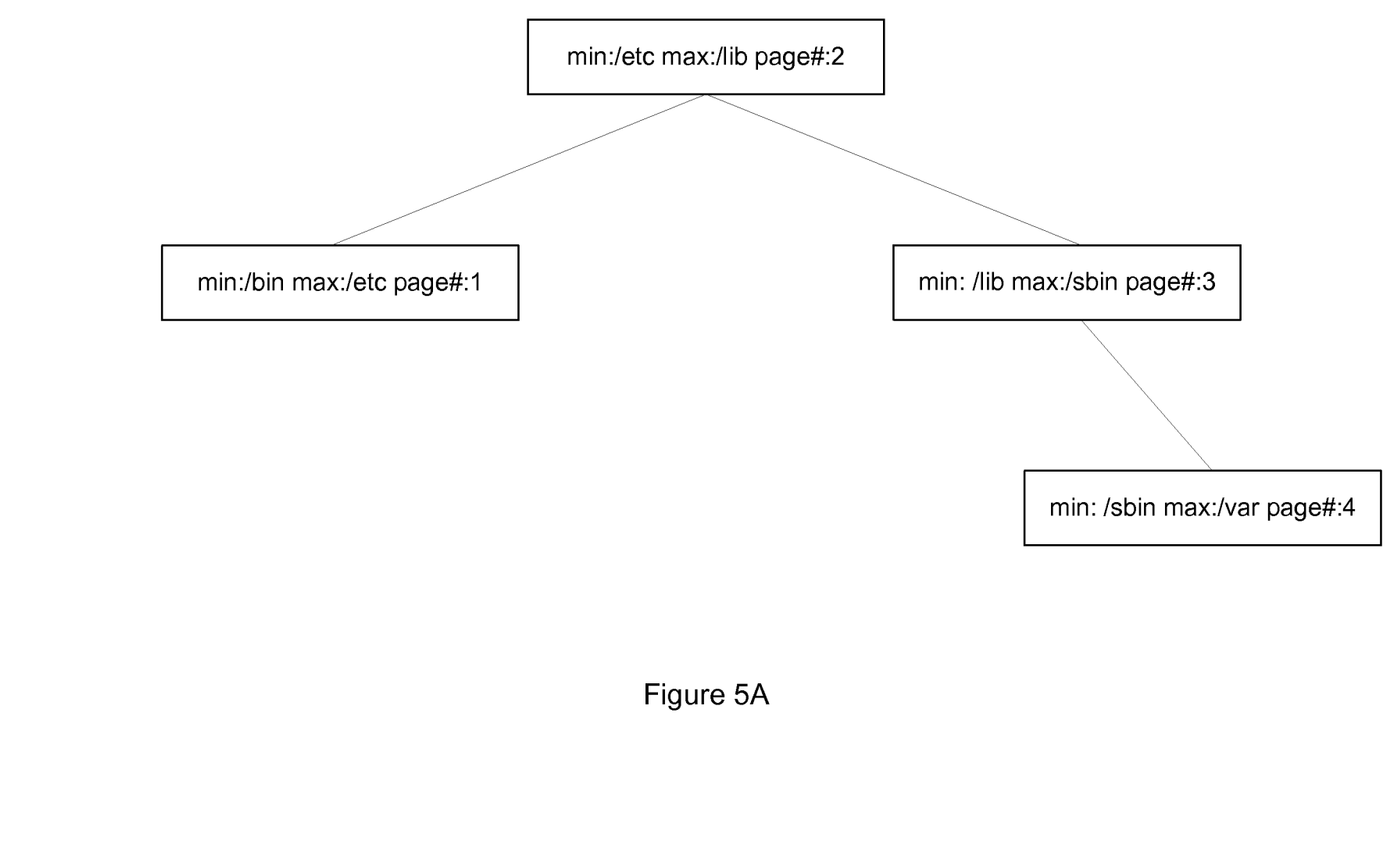
FIG. 5A shows an example of a tree representation of the in memory portion of the guide word paged hash table in a specific embodiment.

In memory portion 435 holds a tree or array of pages that are contained on disk, and the minimum and maximum values or name values that can exist on that page. FIG. 5A shows a tree representation of the array shown in FIG. 4. As shown in the example of FIG. 4, there can be a set of pages 437 resident in memory. These memory resident pages can be a result of prior processes such as requests, accesses, lookups, backups, and the like. Any number of pages can be resident in memory. For example, there can be 20 or 30 pages kept in memory. The number of pages kept in memory can be user-configurable and can depend upon factors such as the amount of memory available.

Typically, filesystems are accessed with a considerable amount of locality. There can be temporal locality or locality in time which refers the principle that if an item is referenced, it will tend to be referenced again soon. There can be spatial locality or locality in space which refers to the principle that if an item is referenced, items whose addresses are close by tend to be referenced soon. The guide word paged table data structure leverages the locality of access to keep a minimum or small amount of data stored in memory. In a specific embodiment, rather than store the entire path name in each entry of the table, only its hash is stored.

Hashing is the transformation of data such as a string of characters into a usually shorter fixed-length value or key that represents the original string. Hashing can be used to index and retrieve items such as in a database because it can be faster to find the item using the shorter hashed key than to find it using the original value. To calculate a hash, an input is provided to a hash function. The value returned by the hash function may be referred to as a hash or hash value. Hashes can be used to implement hash tables. A hash table is a data structure that associates keys with values. Hash tables can be used to support efficient lookups (e.g., given a key such as a name, find the corresponding value). A hash table uses a hash function to compute an index into an array of buckets or slots, from which the correct value can be found. In a specific embodiment, a 20 byte SHA1 (secure hash algorithm) hash is used but any secure hash can be used.

On disk portion 440 stores the pages and page entries. In a specific embodiment, a page includes 70,000 entries. It should be appreciated, however, that a page can be configured to hold any number of entries as desired. In a specific embodiment, the values are stored using opening addressing, using a portion of the hash to assign the bucket location. Other hash techniques may be used but may add to the code complexity and increase the likelihood of software bugs. The original path name need not be stored because a security based hash will give an exact match while looking up the values associated with the name space or filename path. The following statement may be used to add a row of data into the table or data structure: Insert(name, value). The algorithmic complexity may be expressed as: Algorithmic complexity: O(1).

In a specific embodiment, one page is used as the writable page and inserts occur on name, value pairs. As discussed above, in a specific embodiment, each page maintains a minimum and maximum name value for that page. These constitute the "guide words" for that page. These guide words can be thought of similar to guide words that occur at the top of a dictionary page. Using these it can quickly be determined the name range of the entries for that page.

In this specific embodiment, when a name value pair is inserted, the current write page is check for room. If the current write page is full, it is lazy committed to disk and a new write page is established or initialized with the min and max set to (inf,0), i.e., infinity and zero. For example, below is some example code for assigning the minimum and maximum values to a page:

if name<min
    min=name;
    if name>max
    max=name;

Thus, consider as an example that a non-full page has guide words from "/bin" to "/etc." An insert with key "/file" is performed. The new guide words will now be in the range from "/bin" to "/file." The minimum and maximum guide words can define or represent minimum and maximum strings, respectively, for the page that they are associated with.

More particularly, in a specific embodiment, a method includes assigning minimum and maximum guide words to a page; obtaining a name value; inserting into the page an entry for the name value; if the name value is less than the currently assigned minimum guide word, updating the assignment of the minimum guide word to the name value; if name value is greater than the currently assigned maximum guide word, updating the assignment of the maximum guide word to the name value; repeating the obtaining, inserting, and updating until the page is full; and when the page is full, writing the page to disk.

In a specific embodiment, an in memory guide word table is maintained for the paged hash table. An empty entry is found based on the hash(name), in some embodiments, the original name is not stored in the (name, value) pair but only its hash, (hash(name),value). This reduces the total storage of the paged hash table and constrains the name, value pairs to a fixed size.

When the paged table is closed, its pages are flushed to disk along with a copy of the guide word table. All structures of the guide word page hash table are checksumed. The following statement may be used for performing lookups: Lookup(name). The algorithmic complexity may be expressed as: Algorithmic complexity: O(ln2 (n/entries_per_page)).

In a specific embodiment, for the guide word paged hash table, first, the page where the previous entry was found is checked. All other in memory pages that could contain the name are checked, if no entries are found, the guide word table is consulted and non-resident pages that could contain the entry are read into memory until the entry is found. If the number of resident pages exceeds the maximum resident pages, resident pages are ejected following an LRU (Least Recently Used) algorithm. Each item that is looked up is also inserted into a new output set of pages. This maintains access locality for the new set of pages.

Figure 5B:
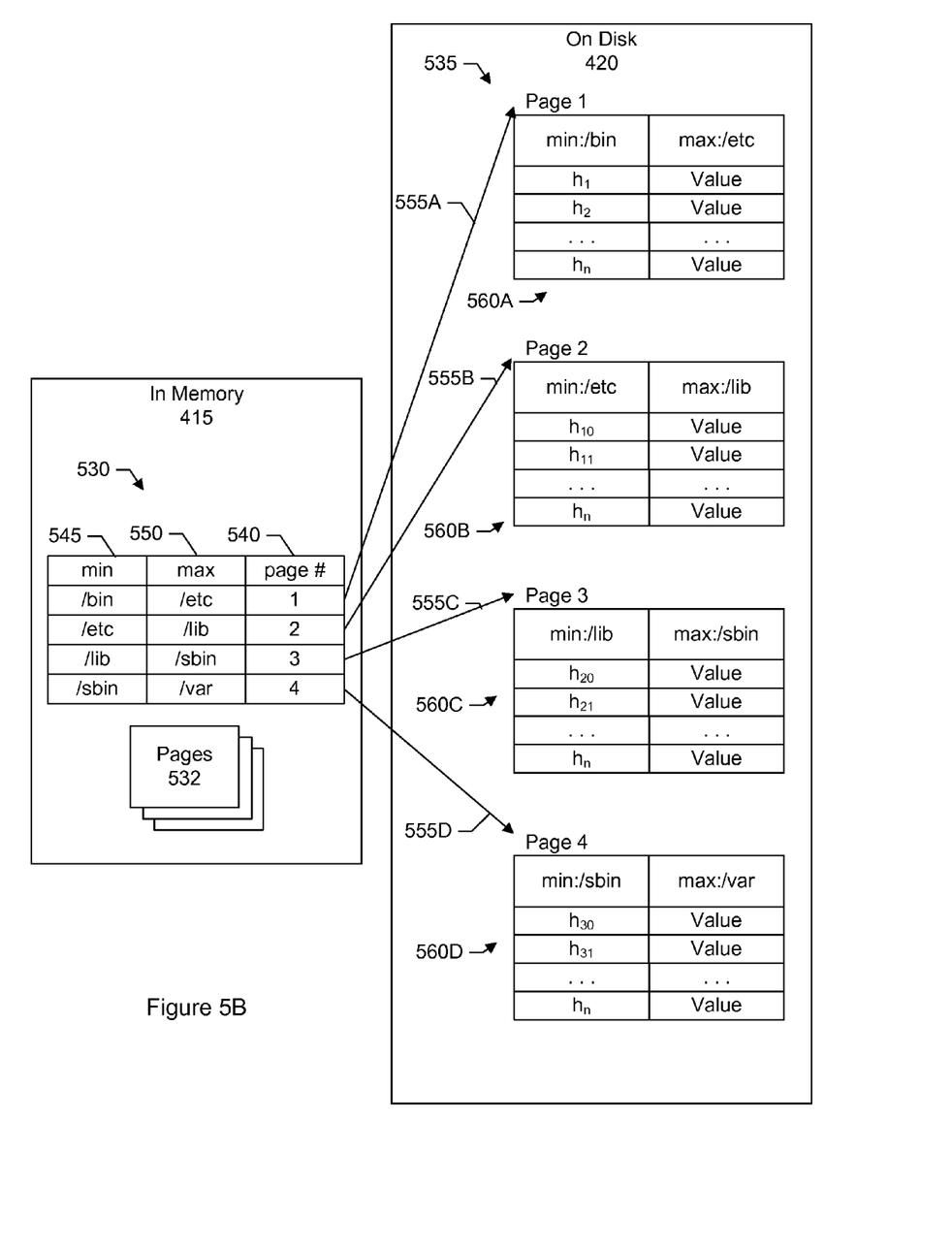
FIG. 5B shows a more detailed example of the guide word paged table data structure shown in FIG. 4.

As a further example, FIG. 5B shows a more detailed view of the guide word paged table data structure shown in FIG. 4. As shown in FIG. 5B, there is an array or set of page headers 530 stored in memory 415. There is a set of pages 535 stored on disk 420. Memory 415 may further include a subset of pages 532 of the set of pages.

The in memory page header information includes a page number 540, a minimum name value 545, and a maximum name value 550. The minimum and maximum name values define the lower and upper limits, respectively, of a name range of entries that may be on a page stored on disk corresponding to the page number. That is, the minimum and maximum values indicate first and last entries, respectively, on the page. The minimum and maximum name values may be referred to as guide words. In a specific embodiment, the in memory portion further includes an offset for the page to allow locating a specific byte or file in the page.

More particularly, as shown in the example of FIG. 5B, the in memory portion includes a table having a first column labeled min (minimum), a second column labeled max (maximum), and a third column labeled page number. The second column is between the first and third columns. The entries in the table may be sorted from lowest to highest, ascending order, highest to lowest, descending order, alphabetically, or any other sort order as desired. The min and max values define a range of values or name values that can exist on the corresponding page that is stored on disk.

For example, the sample data shown in the table includes a first row specifying a minimum value of "/bin" and a maximum value of "/etc" for a first page (page number 1). The first row indicates that an entry associated with a name value between "/bin" and "/etc" will exist, if it exists at all, on page 1.

A second row, below the first row, specifies a minimum value of "/etc" and a maximum value of "/lib" for a second page (page number 2). The second row indicates that an entry associated with a name value between "/etc" and "/lib" will exist, if it exists at all, on page 2.

A third row, below the second row, specifies a minimum value of "/lib" and a maximum value of "/sbin" for a third page (page number 3). The third row indicates that an entry associated with a name value between "/lib" and "/sbin" will exist, if it exists at all, on page 3.

A fourth row, below the third row, specifies a minimum value of "/sbin" and a maximum value of "/var" for a fourth page (page number 4). The fourth row indicates that an entry associated with a name value between "/sbin" and "/var" will exist, if it exists at all, on page 4. The entries are arranged consecutively or sequentially in the in memory index according to the minimum and maximum values.

The set of page headers stored in memory correspond to the set of pages stored on disk. In other words, each page header corresponds to a particular page on disk. For example, page number 1 as identified in memory corresponds 555A to page 1 on disk. Page number 2 as identified in memory corresponds 555B to page 2 on disk. Page number 3 as identified in memory corresponds 555C to page 3 on disk. Page number 4 as identified in memory corresponds 555D to page 4 on disk.

As discussed above, each page on disk includes a set of entries that may be stored in a hash table. For example, page 1 includes a first set of entries 560A. Page 2 includes a second set of entries 560B. Page 3 includes a third set of entries 560C. Page 4 includes a fourth set of entries 560D. As shown in the example of FIG. 5B, each entry may include a hash and an associated value. In a specific embodiment, the hash includes a hash of a path or filename. Hashing the path or filename produces a fixed size value that facilitates lookups and indexing.

For example, path and filenames can be of variable lengths which makes indexing difficult. In a specific embodiment, each row represents a filename. The key is the filename hash (e.g., hash(filename)) and the value is the actual filename. In a specific embodiment, this data structure stores metadata rather than content. Metadata may include filename, pathname, file attributes or properties such as size, times and dates (e.g., time and date created, time and date last modified, time and date last accessed), type information, and the like. In a specific embodiment, the values of the guide word paged data structure track the offset for where the data exists in a stream of files. For example, there may be thousands, millions, or tens of millions of files or more packed into a stream. The guide word paged data structure can be used to store the offset and length for where the file exists in the stream.

Each page is associated with a minimum and maximum name value for that page which, as discussed above, may be referred to as guide words. In the example shown in FIG. 5B, page 1 is associated with the minimum and maximum name values "/bin" and "/etc." Page 2 is associated with the minimum and maximum name values "/etc" and "/lib." Page 3 is associated with the minimum and maximum name values "/lib" and "/sbin." Page 4 is associated with the minimum and maximum name values "/sbin" and "/var." It should be appreciated that while only four pages are shown, this is merely for example and there can be any number of pages.

Figure 6:
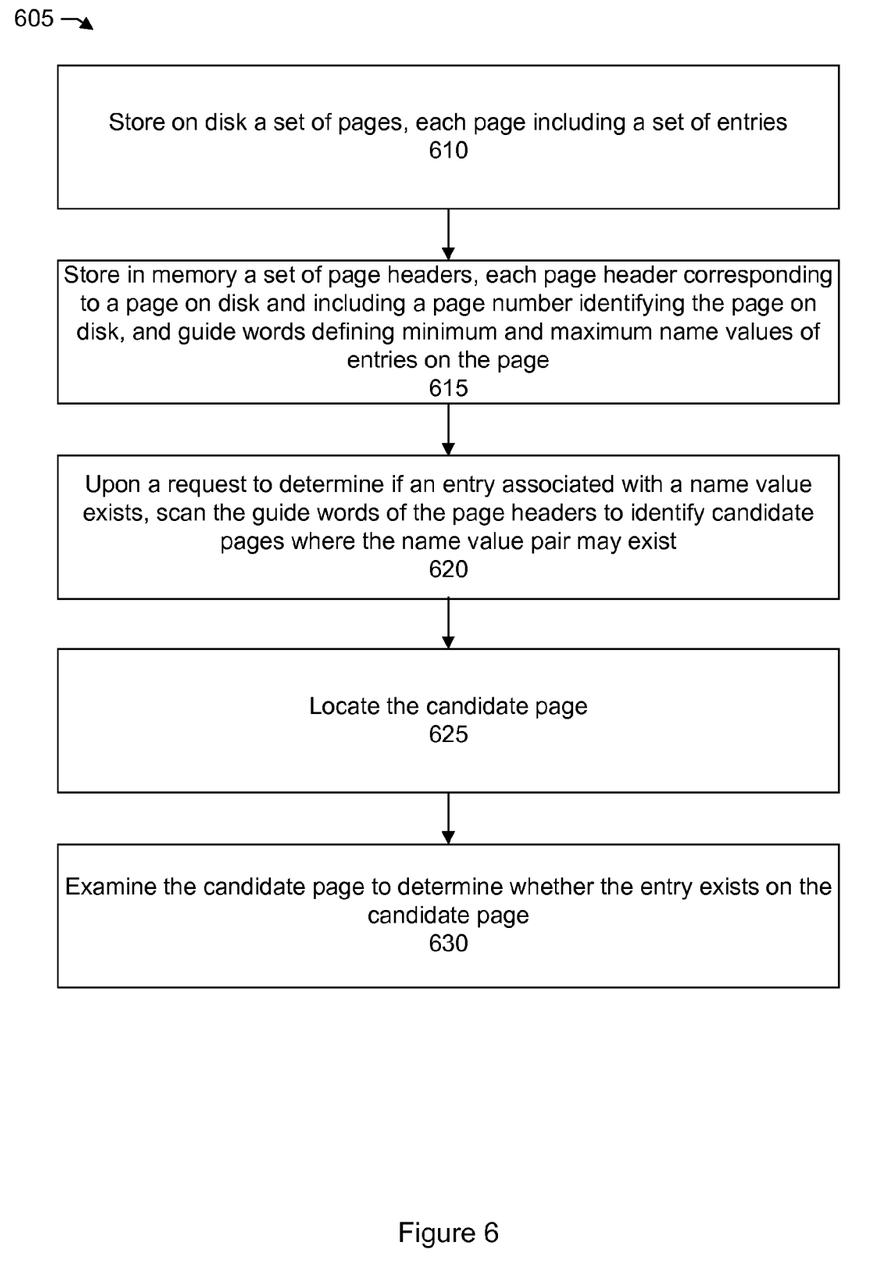
FIG. 6 shows an overall flow diagram of a process for the guide word paged hash table in a specific embodiment.

FIG. 6 shows an overall flow diagram 605 of a process for using a guide word paged hash table in a specific embodiment. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other embodiments may not be exactly the same as the steps presented and may be modified or altered as appropriate for a particular process, application or based on the data.

In a step 610, a set of pages are stored on disk. Each page includes a set of entries. In a step 615, a set of page headers are stored in memory. The page headers are read into memory at initialization time. They are added to after a given page is full and written to disk and they are updated for the active page after each insert. Each page header corresponds to a page of the set of pages and includes a page number identifying the page, and first and second guide words defining minimum and maximum name values, respectively, of entries on the page.

In a step 620, upon a request to determine if an entry associated with a name value exists, the in memory page headers are scanned or searched. The request can include a request to locate, find, or retrieve information such as data, instructions, or records. In a specific embodiment, a binary search is used. In particular, the guide words of the page headers may be browsed in sequence to identify the pages where the name value may exist. These pages, which may be referred to as candidate pages may then be examined in sequence until the first page where the name value does in fact exist is found. In a specific embodiment, the system may identify one or more page numbers for one or more pages where the name value is between the first and second guide words for the page.

For example, a first set of guide words for a first page may be reviewed to determine whether the name value falls between a first name range defined by the first set of guide words. If the name value falls between or within the first name range, a first page number for the first page is identified. The name value may fall within the first name range when the name value is above or greater than a minimum name value of the first set of guide words and below or less than a maximum name value of the first set of guide words.

If the name value falls outside the first set of guide words, a second set of guide words, ordered after the first set of guide words, for a second page may be similarly reviewed to determine whether the name value falls between a second name range defined by the second set of guide words. The system may continue to review or browse through the guide words until one or more page numbers of one or more pages are identified such that the guide words for that page encompass the name value.

In a step 625, a candidate page having the identified page number is located. Depending on available memory, one or more candidate pages may already be in memory. If the candidate page is already memory resident it does not need to be loaded into memory. If a candidate page is not in memory the system may, using the identified page number, locate the candidate page on disk and load the candidate page into memory.

When loading candidate pages into memory it may be necessary to make room for a candidate page. Any competent page replacement algorithm may be used. The algorithm determines which memory page to page out or evict when a page of memory needs to be allocated. If the page to be removed from memory has been modified while in memory it may be rewritten to the disk so that the disk copy is updated. If the page has not been changed, no rewrite may be needed.

In a specific embodiment, the page replacement algorithm includes an LRU (Least Recently Used page replacement algorithm). Other examples of page replacement algorithms include a not recently used (NRU) page replacement algorithm, first-in, first-out (FIFO) algorithm, second-chance page replacement algorithm, clock algorithm, random page replacement (RR) algorithm, not frequently used (NFU) replacement algorithm, aging algorithm, most recently used (MRU) algorithm, and others. Factors to consider in selecting a replacement algorithm may include the percentage of read accesses versus the percentage of write accesses, memory cache size, type of disk media, page size, and others.

In a step 630, the candidate page is examined to determine whether the entry exists on the candidate page. There can be multiple (e.g., two or more) candidate pages that may need to be examined. The determination, however, may be made without examining other non-candidate pages of the set of pages stored on disk. That is, the determination may be made without accessing the disk to locate and retrieve other non-candidate pages.

The amount of memory required to store the in memory portion is very small because the set of pages and accompanying entries are stored on disk. Thus, the entire set of page headers may be loaded into memory. Further, there can be fewer disk accesses as compared to other approaches such as a b-tree. For example, the in memory index allows a look up of the exact page number or page numbers that are needed for examination. In an embodiment, a single disk access or series of accesses can then be made to retrieve the corresponding page or pages. Since accessing disk is relatively slow compared to accessing memory, reducing the number disk accesses results in better performance and response time.

In a specific embodiment, the guide word paged table is applied to deduplicate items or objects during a backup. Deduplication refers to techniques for reducing the amount of storage needed for backups by ensuring that only unique items are stored. Referring now to FIG. 4, in a specific embodiment, the client includes a backup application program 470.

The client may be connected to a server 475 via a communication network 480. In this specific embodiment, the client may be referred to as a backup client and the server may be referred to as a backup server. The backup application is responsible for backing up data from one or more clients to the backup server. The backup application may perform tasks such as dividing a file into chunks, calculating hashes for the chunks, and other backup tasks. The backup application works with the memory manager to backup data from one or more clients to the backup server. In a specific embodiment, the backup application works with the memory manager to help ensure that redundant data (e.g., data previously backed up) is not transmitted to the backup server.

It should be appreciated that the backup application and memory manager may be functional entities where implementation of the functions may vary in different embodiments. In some cases, the backup application and memory manager functions are combined into one code module. In other cases, the backup application and memory manager reside in separate code modules and may interface programmatically such as through an application programming interface (API).

The backup server may include or be connected to a storage device in which data from one or more backup clients is backed up. The storage device may include a content addressed storage (CAS) device or system. A CAS system assigns an identifier such as a hash value to a data unit or data set. The identifier may be referred to as a content or storage address since it is based on the content of the data.

In this specific embodiment, the guide word paged table is used to support caching on the client side for deduplicating during a backup. Systems and techniques are provided for tracking metadata or caching data for a filesystem. The guide word paged table data structure may be used to maintain a set of existing identifiers or hash values corresponding to objects, items, or data that have already been backed up. In a specific embodiment, each backup may be associated with a set of pages. Entries on the pages may track metadata or information about the backup such as items that were backed up, references made to items in a previous backup, other metadata or information, and so forth. That is, the pages may have been created during a previous backup. Pages are not modified once written to disk.

For example, when performing a backup, it can be desirable to determine whether or not a data item has already been backed up such as in a previous backup. If the item has not been previously backed up, the item can be transmitted over the network to the backup server for backup. Alternatively, if the item has been previously backed up to the backup server, a reference to item, rather than the item itself, can be sent to the backup server. Network bandwidth may be conserved since the size of the reference can be much smaller than the size of the data item.

Figure 7:
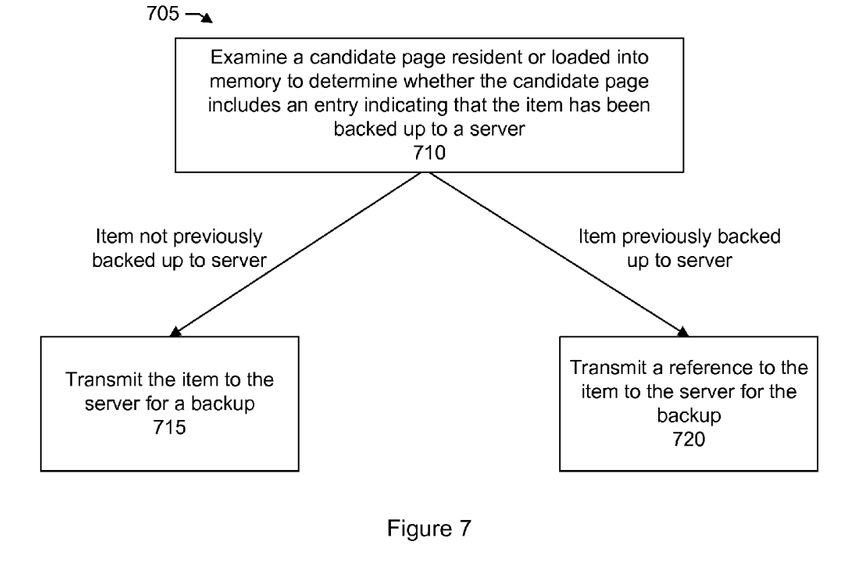
FIG. 7 shows a flow diagram for deduplication during backup using the guide word paged hash table in a specific embodiment.

In particular, FIG. 7 shows an overall flow 705 for a process of the guide word paged table to support backup or deduplication in a specific embodiment. In a step 710, a candidate page resident or loaded into memory is examined to determine whether the candidate page includes an entry indicating that the item has been backed up to the server. In a step 715, if the item has not been backed up to the server, the item is transmitted to the server. Alternatively, in a step 720, if the item has been backed up to the server, a reference to the item, rather than the item itself, is transmitted to the server.

In this specific embodiment, the guide word paged table can be used to quickly identify one or more relevant page numbers without having to scan through numerous entries across numerous pages. Using the page number, the corresponding candidate pages can then be located on disk (if not currently resident in memory) and examined. As discussed above, in a specific embodiment, each backup may be associated with a set or series of pages to track information about a particular backup. In some cases, the ranges defined by the guide words can overlap and multiple guide words from different backups may be examined.

In other words, there can be two or more candidate pages that satisfy a particular range criteria. Having multiple candidate pages to examine may occur when, for example, there is a full backup followed by incremental backups where only those items or files that have changed from the previous backup are written. In this case, determining whether or not an item has been previously backed up may require searching from the full backup through the incremental backups (e.g., searching sets of pages associated the previous backups).

All pages (e.g., all candidate pages) in which item entry may exist may be searched and examined as the same entry could occur on multiple pages because there can be multiple backups. Searching through each candidate page allows the system to identify and reference the most recent version of a backup as backups may be aged out and expired. For example, an organization may maintain 20, 30, or any number of active backups as desired. In various other specific embodiments, depending on the particular application of the guide word paged table, the types of items being looked up, and other factors, there may be a single candidate page, or there may be multiple candidate pages and an entry may potentially exist on only one candidate page.

As discussed, in a specific embodiment, each set of pages written out by the system refers to a particular backup. Backups may be aged out and expired. As a result, a technique is provided for validating cache entries to determine whether a backup or previous backup still exists and that the pages remain valid. In a specific embodiment, a process checks with the backup server to verify that a backup still exists on the backup storage system. For example, if the backup storage system includes a content addressable storage, the verification may be performed by verifying that the backup's root hash exists on the storage system. The root hash can include a hash representing the entire backup.

For example, a set of content pieces or chunks of a backup may be hashed to produce a first set of intermediate hashes. The first set of intermediate hashes may be concatenated together to form a second set of intermediate hashes. The second set of intermediate hashes may be concatenated to form the root hash. If any of the content changes between backups, the root hash will also be changed and the intermediate hashes may be used to identify the content location. There can be any number of levels of intermediate hashes. Instead or additionally, if the backup storage system includes a traditional or network file system ("NFS"), the process may verify the container exists on the storage system. In an embodiment, once the backup has been validated all of the pages of the backup may be marked as valid and ready for use. Alternatively, if the backup no longer exists or is invalid the associated pages may be invalidated. Pages associated with the non-existent backup may be excluded from examination.

In a specific embodiment, principles and aspects of the system are applied to performing a full backup. In this specific embodiment, the guide word paged hash table is used to determine whether an item has been previously backed up. If the item has not been previously backed up, the item is transmitted from the client to the server for the full backup. If the item has been previously backed up, a reference to the item is transmitted from the client to the server for the full backup. An advantage of a full backup over an incremental backup which just backups files that have changed is that restoring from a full backup can be less error-prone and less time-consuming as compared to restoring from an incremental backup. One reason is because restoring from an incremental backup requires restoring a backup set and applying all the incrementals to the restore. With a full backup, only the last full backup set may be needed to restore.

In a specific embodiment, the guide word paged table data structure stores a set entries. Each entry includes a hash identifying an item previously backed up. Consider, as an example, a request to determine whether an item with the path name "/output/results.txt" has been backed up. That is, the system may receive a request to determine whether or not an entry exists in the guide word paged table data structure identifying the item as having been previously backed up.

Using the sample data shown in FIG. 5B, a review of the in memory page headers indicates that the entry will exist, if at all, on page 3 because "/output" falls between the guides words "/lib" and "/sbin" associated with page 3. Page 3 is therefore a candidate page because it may potentially include an entry indicating the item has been backed up. A disk access is then made to locate page 3 on disk and load the page into memory (unless the page is already in memory).

Page 3 is then examined to determine whether there is an existing entry having a hash that matches the hash of "/output/results.txt." If there is an entry on page 3 having a hash that matches the hash of "/output/results.txt," the item is not transmitted to the backup server and instead a reference to the previously backup item is used. If, however, no such entry exists on page 3, the item is backed up. In one embodiment, page 3 may then be updated with a new entry to indicate that the item has been backed up. Alternatively, a new page may be written out with the new entry if, for example, page 3 is full. In another embodiment, new pages are always written for a particular backup, copying existing entries from old pages when a file is found.

In a specific embodiment, a method for accessing data includes storing, on disk, a plurality of pages, each page comprising a plurality of entries, storing, in memory, a plurality of page headers, each page header corresponding to a respective page of the plurality of pages, each page header comprising a page number identifying the respective page, a first guide word, and a second guide word, wherein the first and second guide words define minimum and maximum name values, respectively, of entries on the respective page, upon a request to determine if an entry associated with a name value exists, scanning the first and second guide words of the plurality of page headers stored in memory to identify a page number in a page header where the name value is between first and second guide words of the page header, checking in memory pages for a page having the identified page number, upon determining that the page is not in memory, locating the page on disk and loading, subject to a page replacement algorithm, the page into memory, and examining the page loaded into memory to determine whether the entry exists on the page.

In a specific embodiment, the plurality of entries identify items previously backed up, an existing entry thereby indicating that an item identified by the existing entry has been previously backed up, and the examining the page comprises: if the entry does not exist on the page, transmitting the item to a backup server for a backup. Either way, the entry is written to the current write page. In other words, in a current backup, regardless of whether or not the item was found to have been previously backed up, a current write page for the current backup will be written to.

In a specific embodiment, the plurality of entries identify items previously backed up, an existing entry thereby indicating that an item identified by the existing entry has been previously backed up, and the examining the page comprises: if the entry does exist on the page, transmitting a reference to the backup server for the backup.

In a specific embodiment, the method further includes not examining pages of the plurality of pages where the name value falls outside first and second guide words of page headers corresponding to the pages.

In a specific embodiment, the plurality of page headers are sorted according to the first and second guide words. In a specific embodiment, a subset of the plurality of pages are associated with a backup and the method includes checking with a backup server that the backup is valid, and if the backup is not valid, excluding the subset of pages associated with the backup from the examination.

In another specific embodiment, there is a system for accessing data, the system comprising: a processor-based system executed on a computer system and configured to: store, on disk, a plurality of pages, each page comprising a plurality of entries; store, in memory, a plurality of page headers, each page header corresponding to a respective page of the plurality of pages, each page header comprising a page number identifying the respective page, a first guide word, and a second guide word, wherein the first and second guide words define minimum and maximum name values, respectively, of entries on the respective page; upon a request to determine if an entry associated with a name value exists, scan the first and second guide words of the plurality of page headers stored in memory to identify a page number in a page header where the name value is between first and second guide words of the page header; check in memory pages for a page having the identified page number, upon a determination that the page is not in memory, locate the page on disk and load, subject to a page replacement algorithm, the page into memory; and examine the page loaded into memory to determine whether the entry exists on the page.

In another specific embodiment, there is a computer program product, comprising a non-transitory computer-readable medium having a computer-readable program code embodied therein, the computer-readable program code adapted to be executed by one or more processors to implement a method comprising: storing, on disk, a plurality of pages, each page comprising a plurality of entries; storing, in memory, a plurality of page headers, each page header corresponding to a respective page of the plurality of pages, each page header comprising a page number identifying the respective page, a first guide word, and a second guide word, wherein the first and second guide words define minimum and maximum name values, respectively, of entries on the respective page; upon a request to determine if an entry associated with a name value exists, scanning the first and second guide words of the plurality of page headers stored in memory to identify a page number in a page header where the name value is between first and second guide words of the page header; checking in memory pages for a page having the identified page number, upon determining that the page is not in memory, locating the page on disk and loading, subject to a page replacement algorithm, the page into memory; and examining the page loaded into memory to determine whether the entry exists on the page.

In a specific embodiment, a method includes storing, on disk, a plurality of pages, each page comprising a plurality of entries; storing, in memory, a plurality of page headers, each page header corresponding to a respective page of the plurality of pages, each page header comprising a page number identifying the respective page, a minimum guide word, and a maximum guide word, wherein the minimum and maximum guide words define minimum and maximum name values, respectively, of entries on the respective page; upon a request to determine if an entry associated with a name value exists, scanning the minimum and maximum guide words of the plurality of page headers to identify one or more candidate pages where the name value has a potential to exist, wherein the name value has a potential to exist on a particular page when the name value is between minimum and maximum guide words of the particular page; examining a first candidate page resident in memory to determine whether the name value exists on the first candidate page; after the examining a first candidate page, determining that a second candidate page is not resident in memory; upon the determination, accessing the disk to locate and load into memory the second candidate page; and examining the second candidate page loaded into memory to determine whether the name value exists on the second candidate page.

The method may further include determining that the name value does not exist on any page of the plurality of pages, wherein the determination is made without examining other pages not identified as being one or more candidate pages. The determination may be made without examining non-candidate pages of the plurality of pages. The determination may be made by examining only candidate pages of the plurality of pages.

In another specific embodiment, a method includes storing, in memory, a plurality of page headers, each page header corresponding to a respective page of a plurality of pages, each page header comprising a minimum guide word, and a maximum guide word, wherein the minimum and maximum guide words define a range of name values that may exist on the respective page; upon a request to determine if an entry associated with a name value exists, scanning the minimum and maximum guide words of the plurality of page headers stored in memory to identify one or more candidate pages where the name value has a potential to exist, wherein the name value has a potential to exist on a particular page when the name value satisfies a range of name values as defined by minimum and maximum guide words associated with the particular page; examining each of the one or more candidate pages to determine whether the name value exists on a candidate page; and responding to the request in accordance with the determination, wherein the determination is made without having examined pages that are not candidate pages.

The name value may satisfy the range when the name value is within the range. The name value may satisfy the range when the name value is greater than or equal to the minimum guide word and less than or equal to the maximum guide word associated with the particular page.

In another specific embodiment, a method includes storing, in memory, a plurality of page headers, each page header corresponding to a respective page of the plurality of pages, each page header comprising a minimum guide word, and a maximum guide word, wherein the minimum and maximum guide words define a range of name values that may exist on the respective page; upon a request to determine if an entry associated with a name value exists, comparing the name value to first minimum and first maximum guide words in a first page header; if the name value is greater than the first minimum guide word and less than the first maximum guide word, designating a first page associated with the first page header as being a candidate page; and examining the candidate page to determine whether the entry exists on the candidate page.

In a specific embodiment, a page is associated with two guide words. In another specific embodiment, a page is associated with more than two guide words such as four guide words. In this specific embodiment, third and fourth guide words may be used to represent another dimension such as time. The third guide word may represent a minimum time value. The fourth guide word may represent a maximum time value. Entries on the page may be associated with time values. This allows searches to include (in addition to pathname) time or other criteria in order to further narrow the number of candidate pages to examine.

As discussed above, a specific application of the guide word paged hash table is to support backup processes in a backup system. Aspects and principles of the lookup scheme, however, can be applied to support other operations, processes, and requests in a file system. The data structure can be used to satisfy lookups on namespace data having a high degree of locality.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for accessing data comprising:
    storing, on disk, a plurality of pages, each page comprising a plurality of entries;
    storing, in memory, a plurality of page headers, each page header corresponding to a respective page of the plurality of pages, each page header comprising a page number identifying the respective page, a first guide word, and a second guide word, wherein the first and second guide words define minimum and maximum name values, respectively, of entries on the respective page;
    upon a request to determine if an entry associated with a name value exists, scanning the first and second guide words of the plurality of page headers stored in memory;
    identifying a particular page number in a particular page header when, based on the scan, the name value is between first and second guide words of the particular page header;
    checking in memory pages for a page identified by the particular page number;
    upon determining that the page is not in memory, locating the page on disk and loading, subject to a page replacement algorithm, the page into memory; and
    examining the page loaded into memory to determine whether the entry exists on the page.

2. The method of claim 1 wherein the plurality of entries identify items previously backed up, an existing entry thereby indicating that an item identified by the existing entry has been previously backed up, and the examining the page comprises:
    if the entry does not exist on the page, transmitting the item to a backup server for a backup.

3. The method of claim 1 wherein the plurality of entries identify items previously backed up, an existing entry thereby indicating that an item identified by the existing entry has been previously backed up, and the examining the page comprises:
    if the entry does exist on the page, transmitting a reference to the backup server for the backup.

4. The method of claim 1 comprising:
    not examining pages of the plurality of pages where the name value falls outside first and second guide words of page headers corresponding to the pages.

5. The method of claim 1 wherein the plurality of page headers are sorted according to the first and second guide words.

6. The method of claim 1 wherein a subset of the plurality of pages are associated with a backup and the method comprises:
    checking with a backup server that the backup is valid; and
    if the backup is not valid, excluding the subset of pages associated with the backup from the examination.

7. A system for accessing data, the system comprising:
    a processor-based system executed on a computer system and configured to:
    store, on disk, a plurality of pages, each page comprising a plurality of entries;
    store, in memory, a plurality of page headers, each page header corresponding to a respective page of the plurality of pages, each page header comprising a page number identifying the respective page, a first guide word, and a second guide word, wherein the first and second guide words define minimum and maximum name values, respectively, of entries on the respective page;
    upon a request to determine if an entry associated with a name value exists, scan the first and second guide words of the plurality of page headers stored in memory;
    identify a particular page number in a particular page header when, based on the scan, the name value is between first and second guide words of the particular page header;

check in memory pages for a page identified by the particular page number;

upon a determination that the page is not in memory, locate the page on disk and load, subject to a page replacement algorithm, the page into memory; and examine the page loaded into memory to determine whether the entry exists on the page.

8. The system of claim 7 wherein the plurality of entries identify items previously backed up, an existing entry thereby indicating that an item identified by the existing entry has been previously backed up, and the processor-based system is configured to:

if the entry does not exist on the page, transmit the item to a backup server for a backup.

9. The system of claim 7 wherein the plurality of entries identify items previously backed up, an existing entry thereby indicating that an item identified by the existing entry has been previously backed up, and the processor-based system is configured to:

if the entry does exist on the page, transmit a reference to the backup server for the backup.

10. The system of claim 7 wherein the processor-based system is configured to:

not examine pages of the plurality of pages where the name value falls outside first and second guide words of page headers corresponding to the pages.

11. The system of claim 7 wherein the plurality of page headers are sorted according to the first and second guide words.

12. The system of claim 7 wherein a subset of the plurality of pages are associated with a backup, and the processor-based system is configured to:

check with a backup server that the backup is valid; and if the backup is not valid, exclude the subset of pages associated with the backup from the examination.

13. A computer program product, comprising a non-transitory computer-readable medium having a computer-readable program code embodied therein, the computer-readable program code adapted to be executed by one or more processors to implement a method comprising:

storing, on disk, a plurality of pages, each page comprising a plurality of entries;

storing, in memory, a plurality of page headers, each page header corresponding to a respective page of the plurality of pages, each page header comprising a page number identifying the respective page, a first guide word, and a second guide word, wherein the first and second guide words define minimum and maximum name values, respectively, of entries on the respective page;

upon a request to determine if an entry associated with a name value exists, scanning the first and second guide words of the plurality of page headers stored in memory;

identifying a particular page number in a particular page header when, based on the scan, the name value is between first and second guide words of the particular page header;

checking in memory pages for a page identified by the particular page number;

upon determining that the page is not in memory, locating the page on disk and loading, subject to a page replacement algorithm, the page into memory; and examining the page loaded into memory to determine whether the entry exists on the page.

14. The computer program product of claim 13 wherein the plurality of entries identify items previously backed up, an existing entry thereby indicating that an item identified by the existing entry has been previously backed up, and the examining the page comprises:

if the entry does not exist on the page, transmitting the item to a backup server for a backup.

15. The computer program product of claim 13 wherein the plurality of entries identify items previously backed up, an existing entry thereby indicating that an item identified by the existing entry has been previously backed up, and the examining the page comprises:

if the entry does exist on the page, transmitting a reference to the backup server for the backup.

16. The computer program product of claim 13 wherein the method comprises:

not examining pages of the plurality of pages where the name value falls outside first and second guide words of page headers corresponding to the pages.

17. The computer program product of claim 13 wherein the plurality of page headers are sorted according to the first and second guide words.

18. The computer program product of claim 13 wherein a subset of the plurality of pages are associated with a backup and the method comprises:

checking with a backup server that the backup is valid; and if the backup is not valid, excluding the subset of pages associated with the backup from the examination.

* * * * *